July 1, 1930.  F. B. WILLIAMS  1,769,559
MILK BOTTLE RECEPTACLE
Filed Dec. 21, 1928  2 Sheets-Sheet 1

Inventor
Forrest B. Williams
By *Clarence A. O'Brien*
Attorney

July 1, 1930.  F. B. WILLIAMS  1,769,559
MILK BOTTLE RECEPTACLE
Filed Dec. 21, 1928    2 Sheets-Sheet 2
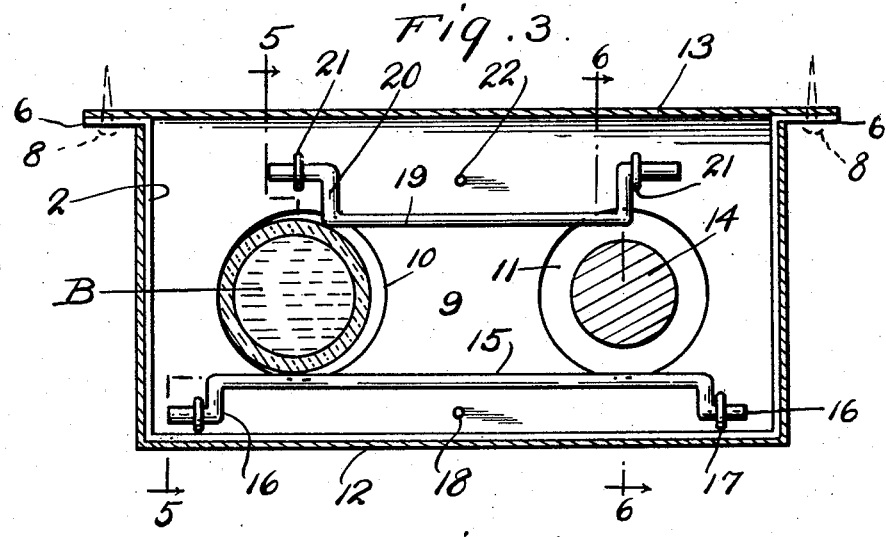
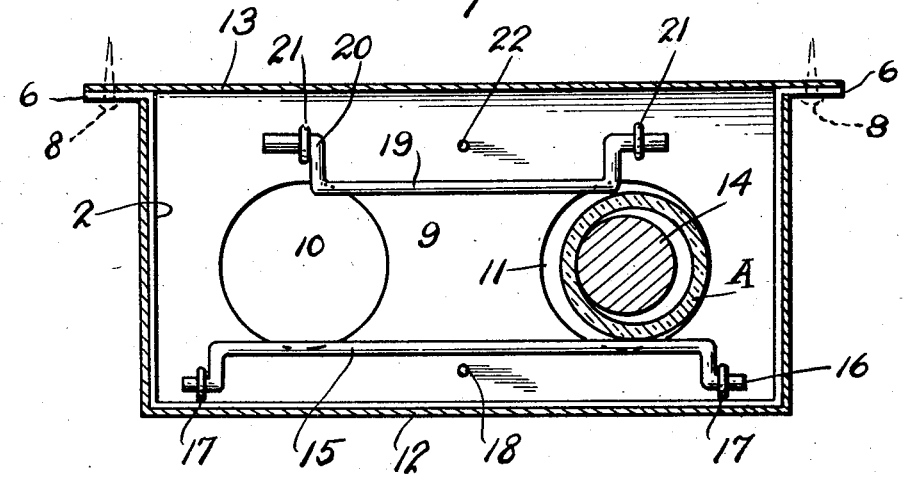
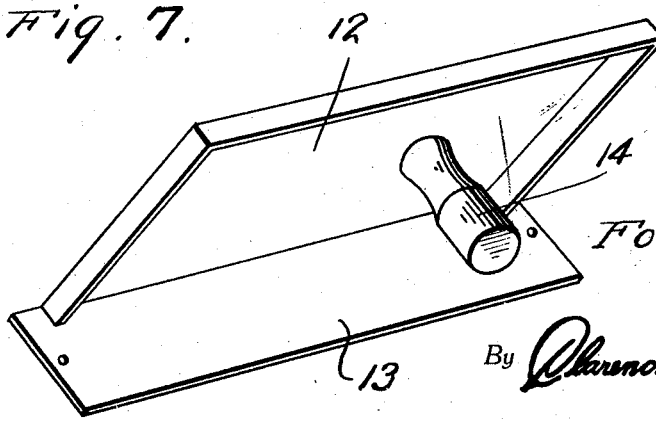
Inventor
Forrest B. Williams
By Clarence A. O'Brien
Attorney Patented July 1, 1930

1,769,559

UNITED STATES PATENT OFFICE

FORREST B. WILLIAMS, OF SHELBY, NORTH CAROLINA

MILK-BOTTLE RECEPTACLE

Application filed December 21, 1928. Serial No. 327,613.

The present invention relates to improvements in milk bottle receptacles, and has reference more particularly to certain improvements over the structure disclosed in my copending application bearing Serial No. 268,880 filed April 10, 1928.

One of the objects of the present invention is to provide a milk bottle receptacle wherein an empty milk bottle deposited in the receptacle cannot be removed by the milkman unless a full bottle of milk is placed in the receptable, and in a similar manner, the person to whom the milk is delivered cannot remove the full bottle of milk without placing an empty bottle in the receptacle in exchange.

Another important object of the invention is to provide a device of the above mentioned character that will permit empty and full bottles to be readily and easily inserted and removed from the receptacle, so that the milk man will not lose any unnecessary time in depositing and collecting bottles.

Still a further object is to provide a milk bottle receptacle of the above mentioned character that includes an elongated block having enlarged openings formed vertically therethrough for the reception of the mouth portions of the milk bottles, suitable locking rods being arranged within a casing that extends around and above the block for cooperation with the openings, said rods being automatically lifted upwardly when a bottle is inserted in either opening, the rods further cooperating with the bead of the mouth of the bottle for suspending the same from the receptacle and in such a manner as to prevent the removal of the suspended bottle by force; the suspended bottle being capable of being removed only when another bottle is inserted upwardly through the other opening in the block whereby to release the locking rod, the last mentioned bottle being subsequently locked in a suspended position from the receptacle.

Another important object is to provide a milk bottle receptacle of the above mentioned character that can be secured on the side of a house or upon any other suitable support within easy access to the milk man as well to the housewife.

Another important object is to provide a milk bottle receptacle of the above mentioned character that is simple in construction, inexpensive, strong and durable and further well adapted to the purpose for which it is designed.

Other objects and advantages of the invention will become apparent from the following description when taken in connection with the accompanying drawings.

In the accompanying drawings wherein like reference characters indicate corresponding parts throughout the several views:

Figure 3 is a sectional view taken approximately on the line 3—3 of Figure 1 looking downwardly showing the manner in which a full bottle of milk is secured in a locked suspended position, the locking rod being shown in top plan.

Figure 4 is a view similar to Figure 3 showing an empty bottle locked in a suspended position from the receptacle.

Figure 7 is a detail perspective view of the lid for the casing showing the enlarged pin that projects downwardly from the top of the lid through the opening formed in the block to receive the neck of an empty milk bottle.

Figure 1:
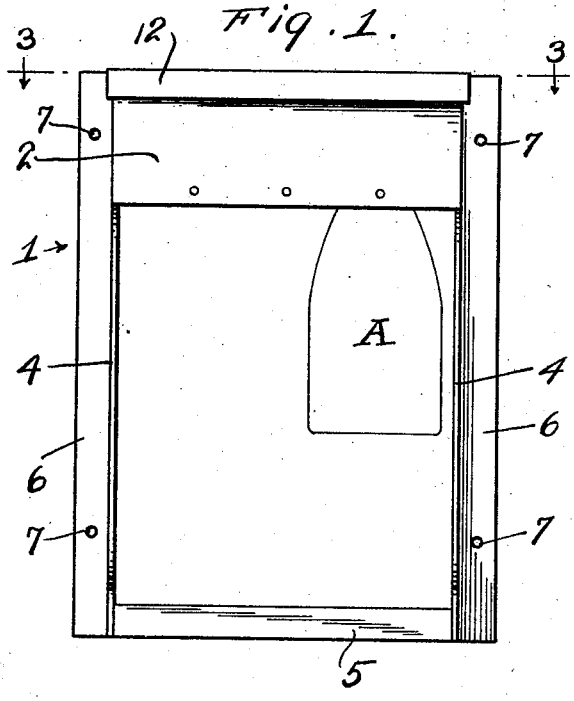
Figure 1 is a front elevation of my improved milk bottle receptacle.
Figure 2:
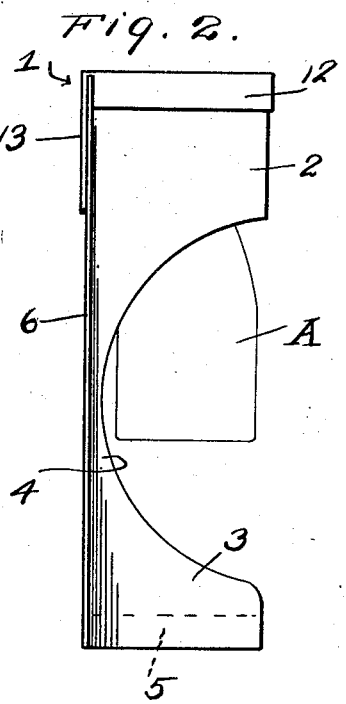
Figure 2 is a side elevation thereof.
Figure 5:
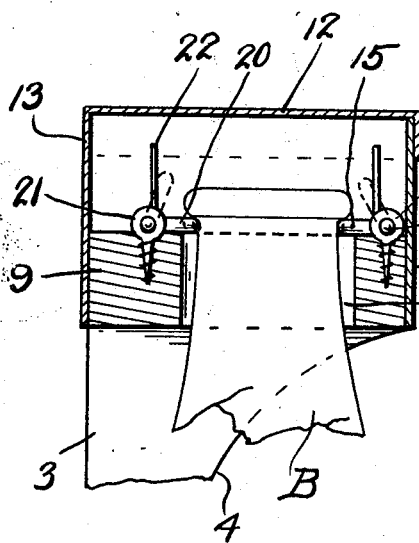
Figure 5 is a sectional view taken approximately on the line 5—5 of Figure 3 looking in the direction of the arrows.
Figure 6:
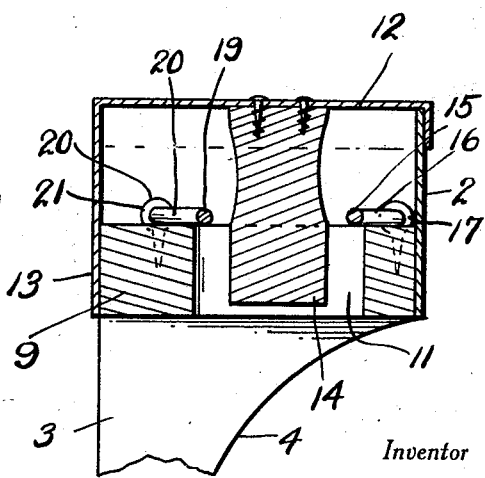
Figure 6 is a similar section taken approximately on the line 6—6 of Figure 3 also looking in the direction of the arrows.

In the drawings wherein for the purpose of illustration is shown the preferred embodiment of my invention, the numeral 1 designates generally my improved milk bottle receptacle, the same comprising a substantially rectangular shaped sheet metal casing 2 that is open at its bottom, top and rear sides. The end walls of the casing are formed with depending extensions 3, the intermediate portion of each extension being cut out as at 4 with reference more particularly to Figure 2. A shelf 5 is secured between the lower end of the extensions 3 by any appropriate fastening means, while the rear edges of the extension as well as the respective end walls of the casing are disposed laterally in an outward direction to provide attaching flanges 6. Each of these flanges is formed with suitable openings 7 to accommodate fastening screws or the like shown at 8 whereby the receptacle may be nailed to the wall of a house or other building within easy reach of the milk man as well as the housekeeper.

A substantially rectangular shaped wooden block 9 of a suitable thickness is secured within the bottom of the casing 2 and this block is formed adjacent its respective ends with the enlarged openings 10 and 11, respectively. These openings extend vertically through the block 9, and the purpose thereof will be presently described.

A flanged lid 12 is removably fitted over the open top portion of the casing and the rear edge of the top of the lid is formed with a depending plate like portion 13 that provides a closure for the open rear side of the casing, the ends of the plate-like member extending beyond the respective ends of the casing and the projecting end portions of this plate are formed with openings that register with the openings 7 to receive the securing means 8 as clearly indicated in Figures 3 and 4.

An enlarged circular pin 14 is attached at its upper end to the bottom of the lid 12 and the lower portion of this pin extends downwardly and centrally through the opening 11 formed in the block 9 for a purpose also to be presently described.

The invention further comprehends the provision of an improved locking means for securing the bottles in a suspended manner from the casing and to this end, there is provided the elongated locking rod 15 that is formed at its ends with the crank portions 16 and these crank portions are loosely disposed through eye members 17 and project upwardly from the top of the block 9 adjacent the front side of the casing, and the locking rod 15 has portions thereof extending across the forward edge portions of the openings 10 and 11. This locking rod 15 is capable of vertical swinging movement and is limited in its upward swinging movement by means of the upstanding pin 18.

A similar but shorter locking rod 19 is arranged on the upper face of the block 9 on the opposite side of the openings, and the ends of the locking rod 19 also terminates in crank portions 20 that are loosely fitted in upstanding eye members 21 secured in the block 9. This last mentioned locking rod is also adapted for vertical swinging movement, and a pin 22 similar to the pin 18 is provided for limiting the upward swinging movement of the locking rod 19. Furthermore the locking rod 19 is adapted for longitudinal slidable movement as suggested in Figures 3 and 4 of the drawings, and it will be observed upon referring to these particular figures that the portions of the locking rods that join with the respective cranks 20 extend inwardly of the edge of the openings 10 and 11 so as to be within the path of movement of the neck or mouth of a bottle.

The operation of my improved milk bottle receptacle may be briefly stated as follows. The housekeeper inserts an empty milk bottle upwardly through the opening 11 so that the mouth of the bottle will pass upwardly around the lower end portion of the pin 14, and the bead of the bottle will push the locking rods 15 and 19 upwardly to permit the bead of the bottle to move above the locking rod and then by releasing the bottom of the bottle, the locking rods will by gravity move downwardly so as to engage with the bottom portion of the bead. In this manner the empty bottle is locked in a suspended position from the casing.

The milk man in delivering a bottle of milk places the neck portion of the full bottle upwardly in the opening 10, and simultaneously grasps the empty bottle A and during the upward movement of the neck of the full bottle B, the same actuates the locking rods 15 and 19 to disengage the same from the bead of the neck of the empty bottle A so that said empty bottle may be readily and easily removed from the opening 11. At the same time, the locking rod 19 will cause to slide to the right so that one of the arms of the crank portion 20 will engage against the eye member 21 that is located adjacent the opening 11.

Then the bottle of milk is locked in a suspended position from the casing and can only be removed when an empty bottle is inserted in the opening 11, and this operation will result in the disengagement of the locking rods 15 and 19 from the bead of the neck of the full bottle, at the same time the locking rod 19 will be moved to the left.

The purpose of the pin 14 is to provide a means whereby a person cannot stick his hand upwardly in the opening 11 to actuate the locking rods 15 and 19 when a bottle of milk is placed in the receptacle for the purpose of stealing the bottle of milk.

It will thus be seen from the foregoing description that I have provided a milk bottle receptacle which will absolutely necessitate the replacement of a bottle that is removed from the receptacle with another one before a bottle can be removed from the receptacle. Also the provision of a structure of this character will protect the milk bottles from inclement weather and also will prevent animals from gaining access thereto.

The simplicity of my device enables the same to be constructed at all times at a very low cost and be positive and efficient in carrying out the purposes for which it is designed.

While I have shown the preferred embodiment of my invention it is to be understood that minor changes may be made therein without departing from the spirit of the invention and the scope of the appended claims.

Having thus described the invention, what I claim as new and desire to secure by Letters Patent is:—

1. In a milk bottle receptacle of the class described, a block formed with a pair of enlarged openings, an enclosure for the top of the block, locking rods arranged for vertical swinging movement on the upper face of the block, portions of said locking rods being disposed across opposite sides of the respective openings, said locking rods cooperating to secure the neck of a bottle in one of the openings, said locking rods being moved to a raised inoperative position out of engagement with the aforementioned bottle when another bottle is inserted in the other opening and engages the locking rod to move the same upwardly, and means for limiting the upward swinging movement of the locking rods so that the same will by gravity drop to an operative position.

2. In a milk bottle receptacle of the class described, a casing open at its bottom, a block secured in the bottom of the casing and provided with a pair of enlarged bottle receiving openings, a pair of opposed locking rods arranged on the upper face of the block on opposite sides of the opening, each locking rod being formed at its ends with crank portions, eye members extending upwardly from the block to receive said crank portions whereby the locking rods are mounted for vertical swinging movement, portions of the locking rods extending across the openings within the path of movement of the neck of the bottle, said locking rods cooperating to secure the neck of the bottle in a suspended position from the casing, said bottle being released when another bottle is inserted in the other opening in the block and said locking rods are swung upwardly to an inoperative position.

3. In a milk bottle receptacle of the class described, a casing open at its bottom, a block secured in the bottom of the casing and provided with a pair of enlarged bottle receiving openings, a pair of opposed locking rods arranged on the upper face of the block on opposite sides of the opening, each locking rod being formed at its ends with crank portions, eye members extending upwardly from the block to receive said crank portions whereby the locking rods are mounted for vertical swinging movement, portions of the locking rods extending across the openings within the path of movement of the neck of the bottle, said locking rods cooperating to secure the neck of the bottle in a suspended position from the casing, said bottle being released when another bottle is inserted in the other opening in the block and said locking rods are swung upwardly to an inoperative position, and means for limiting the upward swinging movement of the locking rods.

In testimony whereof I affix my signature.

FORREST B. WILLIAMS.